May 14, 1963 S. BROUDO 3,089,669
FLEXIBLE CYLINDER LAUNCHER
Filed April 28, 1961 2 Sheets-Sheet 1
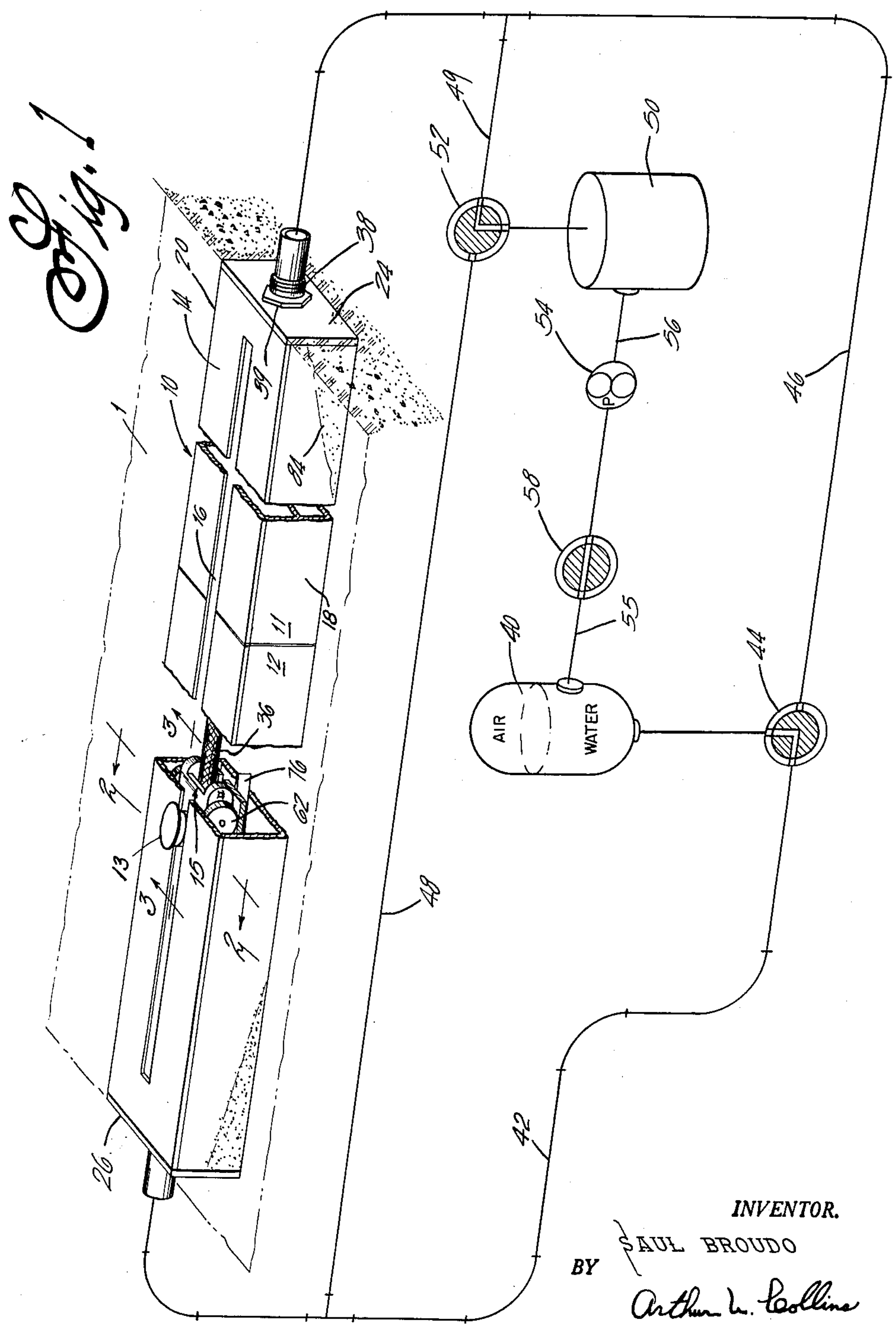
INVENTOR.
SAUL BROUDO
BY Arthur L. Collins
ATTORNEY May 14, 1963 S. BROUDO 3,089,669

FLEXIBLE CYLINDER LAUNCHER

Filed April 28, 1961 2 Sheets-Sheet 2

INVENTOR.
SAUL BROUDO

BY

ATTORNEY 3,089,669

FLEXIBLE CYLINDER LAUNCHER

Saul Breudo, Philadelphia, Pa., assignor to the United States of America as represented by the Secretary of the Navy Filed Apr. 28, 1961, Ser. No. 115,278
8 Claims. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

This invention relates to launching devices by which an added impetus is provided to self propelled aircraft so as to enable them to become airborne.

Conventionally, such devices embrace a track guided shuttle, to which the aircraft is disengageably connected, and a longitudinally slotted cylinder within which there is a piston with an arm transversely projecting through the slot and coupled to the shuttle. A force, as created by the expansion of steam or some other fluid, accelerates the piston, and the shuttle is thereby moved over the length of the cylinder.

This cylinder-piston catapult is, by necessity, a heavy massive, metallic piece of equipment which is restricted to a permanent site. Furthermore, the slot in the cylinder presents a constant sealing problem together with a tendency for the cylinder to lose its shape. The solutions offered as remedies have proven to be no more than temporary.

In the catapult engines utilizing steam, there is the further problem of providing costly, huge steam generating plants and of having to contend with hot parts in the event of making immediate repairs.

It is then an object of this invention to provide a novel launcher which is relatively light, inexpensive to make, and is adapted for temporary launching installations.

Another object is to provide a launcher which does not use the conventional longitudinal slot in its power cylinder and is adapted for activation by relatively cool fluids.

Other and more detailed objects of the invention will become apparent from the drawings and the following description.

The accompanying drawings show, for purposes of illustration, one embodiment in which the invention may take form.

In the drawings:

FIGURE 1 is a view of the invention showing its trackway perspectively with portions broken away, the related power supply shown schematically, and the various elements set for a launching from the left to the right;

FIGURE 2 is a cross-sectional view along line 2—2 of FIGURE 1;

Figure 4:
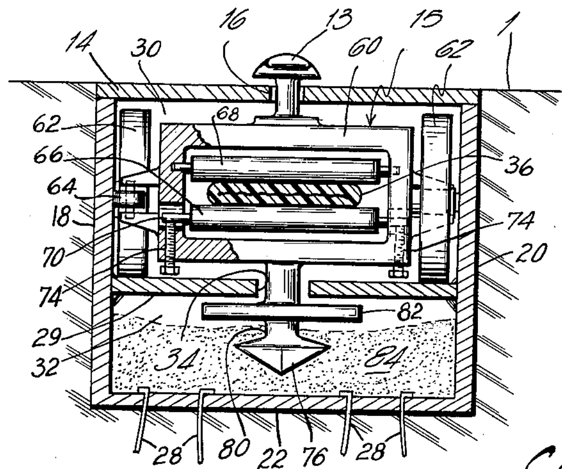

Referring to the drawings, a take-off surface is indicated at 1 from which an aircraft (not shown) is to be catapulted by the invented device. The latter is shown to have a trackway 10 made of a series of sections, two of which are identified at 11 and 12, joined end-to-end in some manner, as by welds (not shown) to form an extended member with a length suitable for catapulting operations. It is sunk into the take-off surface 1 so that its top 14 is level with it. A launch hook 13 of a shuttle 15 protrudes above the top 14 in a longitudinal slot 16 so as to permit its coupling to an aircraft, for instance, by a bridle (not shown).

The trackway 10 includes (FIGURE 2) a pair of vertical sides 18 and 20, a bottom 22, ends 24 and 26, and the top 14; these are arranged and interconnected to form a box-like beam, which is closed except for the slot 16. It is preferred that top 14 be secured in a manner to permit its removal. Pins 28, driven through the bottom 22, hold the trackway 10 securely in a fixed position. There is also a horizontal partition 29 secured to the inner surfaces of the sides 18 and 20, intermediate the top 14 and bottom 22 which divides the inner confines of the trackway 10 into an upper or shuttle launch chamber 30 and a lower or shuttle brake chamber 32. Communication between the chambers is made through a longitudinal slot 34, which, like slot 16, extends for at least the launching distance.

A flexible, non-extensible, cylinder 36 is disposed on partition 29 in launch chamber 30 which can be pinched shut by an external force and yet can maintain a cylindrical configuration with inflation. Power for moving shuttle 15 is developed by inflating cylinder 36 from one of its ends, as will be more evident hereafter. It is preferred that cylinder 36 be made of a rubberized fabric similar in construction to a fire hose. A threaded collar, 38, is furnished at each end of cylinder 36 which projects through an end plate of the trackway 10 and is secured thereto by nuts, 39, on either side of it.

Fluid pressure, preferably liquid, such as water, is supplied to one end of cylinder 36 (FIGURE 1) from an accumulator 40 to which it is communicatively connected by a conduit 42 through two-way valve 44. Likewise, a conduit 46 connects the cylinder's other end to accumulator 40 through two-way launch valve 44. Pressure can thus be supplied to either end of cylinder 36 by turning valve 44 in the proper direction.

Each end of cylinder 36 is also connected for individual venting or draining. For the purpose, conduits 48 and 49 are provided which empty into a drain tank 50 by way of a two-way drain valve 52. By opening valve 52 in the desired direction, cylinder 36 may be drained from either side.

Accumulator 40 is charged with liquid by a pressure pump 54 which is connected to it and to drain tank 50 by conduits 55 and 56. A check valve 58 in conduit 55 permits fluid flow from the pump 54 to accumulator 40 while blocking flow in the opposite direction.

Figure 3:
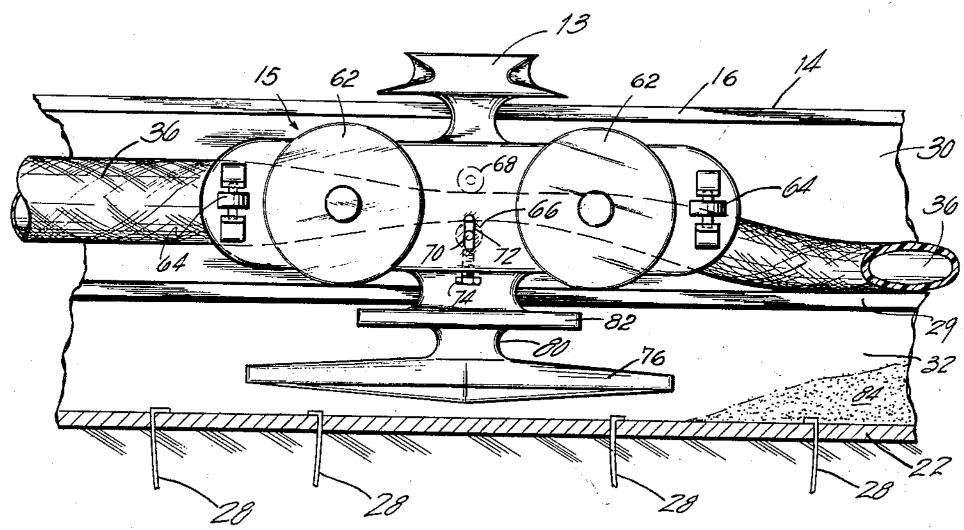
FIGURE 3 is a longitudinal sectional view along line 3—3 of FIGURE 1.

Shuttle 15, which is moved under power developed in cylinder 36, is mounted within launch chamber 30 of trackway 10 for reciprocable movement. The shuttle has a body 60 (FIGS. 2 and 3) from which extends the shuttle hook 13 through slot 16 and to which aircraft are connected for launching. Hook 13 is, in effect, a double hook as shown in FIG. 3 in that it has forward and rearward notches so that a pendant may be secured to it regardless of the direction in which shuttle 15 moves. The shuttle body 60 is an open-ended, hollow, box having wheels 62 on its outer sides for riding on partition 29, and wheels 64, disposed in a horizontal plane for riding on the inner surfaces of sides 18 and 20 of trackway 10.

The connection between shuttle 15 and cylinder 36 is an external one and is made by passage of the cylinder 36 through the body 60 between a pair of opposed rollers 66 and 68 journaled within the shuttle body. The rollers are in a vertical plane transverse to the cylinder's axis but their own axes may be vertical, or horizontal, as shown in FIGURE 3. The nip between the rollers 66 and 68 is such that the cylinder wall is pinched tightly to prevent any fluid flow in the cylinder past the rollers. The ends of the shaft 70 on roller 66 set in slots 72 in the side walls of shuttle body 60 and can be moved vertically by turning set screws 74; this permits adjusting the roller nip and thereby the squeezing effect on the cylinder 36. As is apparent, with inflation of cylinder 36 from one of its ends, the fluid pressure exerts an outward force on the cylinder wall at the point when rollers 66 and 68 pinch it together. Inasmuch as no fluid escapes beyond the rollers, they are forced to move longitudinally of the cylinder 36 along trackway 10. This movement, consequently, propels shuttle 15. In the movement of shuttle 15, the cylinder 10 is picked up from partition 29 at the forward end of the shuttle, passed through the rollers 66 and 68 and let down to the partition at the shuttle's rearward end.

The use of dual, opposed rollers 66 and 68 assures an even distribution of bending stress on both sides, top and bottom, of the wall of cylinder 36. Furthermore, the wear is even on the cylinder wall resulting from friction with rollers 66 and 68.

To arrest shuttle 15 at the end of the launch, it is provided with a brake spear, 76, suspended from it on a web 80 into brake chamber 32. This is a double spear resembling the double launch hook 13, that is, it is pointed at both its forward and rearward ends and is adapted for arrestments of the shuttle whether the shuttle is moving in either direction on the trackway 10.

A horizontal flange 82 extends from each side of web 80 and lies under trackway partition 29. It restrains vertical motion of shuttle 15, keeping the shuttle wheels on the partition 29.

Brake chamber 32 at the ends of trackway 10, is filled with comminuted, hard material 84 (FIG. 2), such as gravel or, preferably, sand. It provides a cushion into which the spear 76 is impaled in making an arrestment. The frictional resistance offered by the material 84 to spear 76 halts the shuttle's forward movement.

In use, accumulator 40 having been charged with pressure by pump 54, shuttle 15 is positioned at one end, for instance, the left end in FIG. 1, of trackway 10 and an aircraft is coupled to launch hook 13 in some conventional manner. Drain valve 52 is opened to allow the right side of cylinder 36 to completely drain through conduit 49. Launch valve 44 is then opened to admit fluid to the left side of cylinder 36 by way of conduit 42. This inflates cylinder 36 from the end and causes shuttle 15 to move to the right.

When shuttle 15 has progressed to the end of the launch distance, spear 76 is driven into loose material 84 and the shuttle is halted.

Shuttle 15 is returned to its original position by reversing valves 44 and 52 from the positions described above; this drains the left side and inflates the right side of cylinder 36. Obviously an aircraft may be launched, from the right to the left of trackway 10 and the invention may, thus, be utilized for bi-directional launches.

Having described and illustrated only one embodiment, it is to be understood that it is susceptible to changes apparent to those skilled in the art without departing from the spirit of the invention. It is preferred, therefore, that this disclosure not be taken in a limiting sense, but that the true scope of the invention be determined by the attached claims.

What is claimed is:

1. In an aircraft launching apparatus, a longitudinal trackway, a shuttle in said trackway adapted for coupling to an aircraft, said shuttle having a hollow, open-ended body, opposed rollers mounted within said body, a flexible, nonextensible, inflatable cylinder disposed in said trackway and passing through said shuttle body between said rollers and being pinched closed thereby, means for inflating said cylinder from one end thereof with fluid, whereby a force is exerted on the wall of said cylinder causing said shuttle to move longitudinally thereof, a spear projecting from the forward end of said shuttle, and hard comminuted material filling the end-of-launch portion of said trackway whereby forward movement of said shuttle is arrested by said spear being driven into said material.

2. An aircraft launcher comprising a longitudinal trackway having a longitudinal brake chamber and a superimposed longitudinal launch chamber separated by a partition with a longitudinal slot therethrough, a shuttle mounted for reciprocable movement in said launch chamber having a hollow, open-ended body, opposed rollers mounted in said body, a flexible, non-extensible, inflatable cylinder disposed in said trackway passing through said shuttle body between said rollers and being pinched closed thereby, a source of pressurized fluid, a two-way launch valve, conduit means connecting said source of fluid through said launch valve to each end of said cylinder for inflation thereof from either end, valved means for draining fluid from either end of said cylinder, a spear projection from the forward end of said shuttle into said brake chamber, and comminuted material filling an end portion of said brake chamber whereby movement of said shuttle is arrested by said spear being driven into said material.

3. The launcher of claim 2 wherein said fluid is liquid.

4. The launcher of claim 2 wherein said shuttle has a double launch hook adapted for coupling to an aircraft with movement of said shuttle in either direction, both ends of said brake chamber are filled with said material, and said spear is a double spear so that movement of said shuttle in either direction is arrested.

5. In an aircraft launcher a shuttle to be propelled in a forward or rearward direction by the inflation of a flexible cylinder and to be arrested by engagement with comminuted material in said launcher comprising a hollow open-ended body, opposed rollers mounted in said body adapted for having said cylinder passed therebetween and pinching thereof closed against the passage of fluid, and a double launch hook extending therefrom adapted to be connected to an aircraft for towing thereof regardless of the direction of movement of said shuttle, and a double brake spear suspended from said shuttle for arresting movement thereof in either direction.

6. An aircraft launcher comprising a longitudinally extending trackway with forward and rearward terminals and having a brake chamber and a superimposed launch chamber separated by a partition having a slot extending the length thereof, a shuttle mounted for reciprocable movement in said launch chamber including a hollow open-ended body, opposed rollers mounted in said body, a flexible, inflatable cylinder disposed in said launch chamber passing through said body between said rollers, and being pinched closed thereby, a source of pressurized fluid, a two-way launch valve, conduit means interconnecting each end of said cylinder with said source of pressurized fluid through said launch valve, a two-way drain valve, second conduit means interconnecting each end of said cylinder through said drain valve for draining from either end thereof, a web extending from said shuttle through said slot into said brake chamber, a double spear supported in said brake chamber by said web, comminuted material filling the ends of said brake chamber, said spear being adapted to be driven into said material and arresting movement of said shuttle in either direction.

7. The launcher of claim 6 including means extending from said web adapted for restraining vertical movement of said shuttle.

8. The device of claim 6 including means for adjusting the pinching effect of said rollers on said cylinder.

References Cited in the file of this patent

UNITED STATES PATENTS

| | | |
|---|---|---|
| 1,405,658 | Bazzeghin | Feb. 7, 1922 |
| 2,856,139 | Lockwood | Oct. 14, 1958 |
| 2,979,163 | Van Velm et al. | Apr. 11, 1961 |
| 3,035,794 | Murray | May 22, 1962 |